June 19, 1945.  H. G. HOLMES  2,378,631
WHEEL ALIGNER
Filed Oct. 19, 1942  4 Sheets-Sheet 1
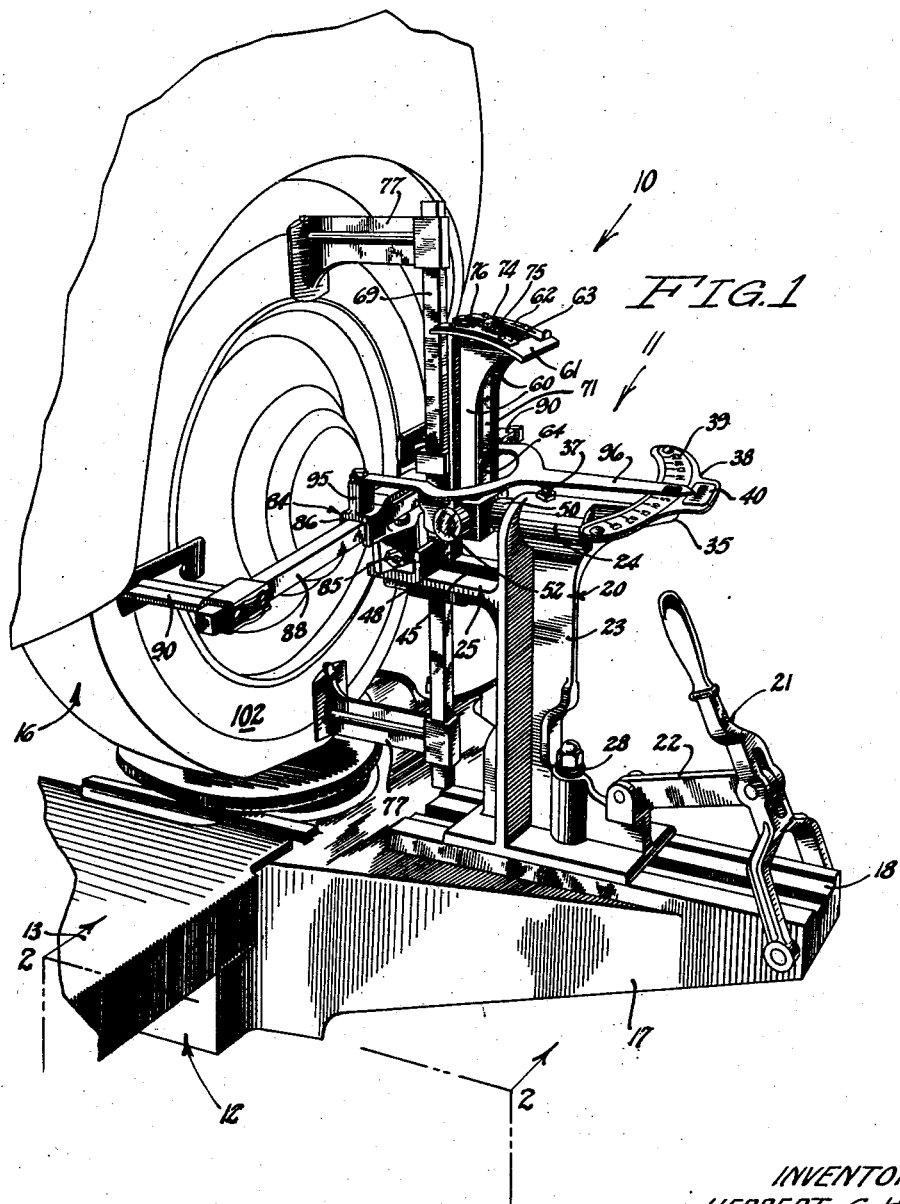
INVENTOR:
HERBERT G. HOLMES
BY
ATTORNEY June 19, 1945.   H. G. HOLMES   2,378,631
WHEEL ALIGNER
Filed Oct. 19, 1942   4 Sheets-Sheet 2

INVENTOR:
HERBERT G. HOLMES
BY
ATTORNEY

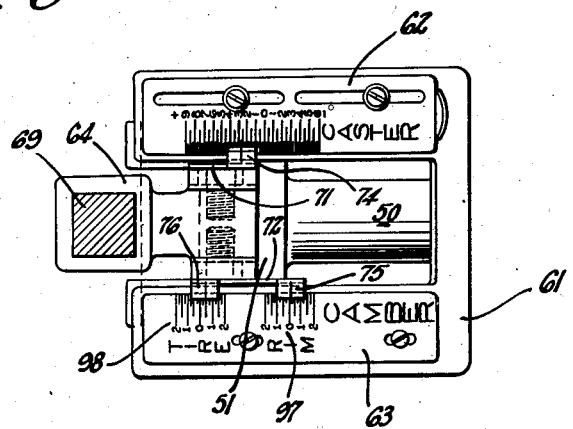

Patented June 19, 1945

2,378,631

UNITED STATES PATENT OFFICE 2,378,631

WHEEL ALIGNER

Herbert G. Holmes, Lansing, Mich., assignor to Food Machinery Corporation, San Jose, Calif., a corporation of Delaware Application October 19, 1942, Serial No. 462,476

8 Claims. (Cl. 33—203)

This invention relates to the art of measuring the alignment characteristics of a pair of dirigible wheels of a vehicle and particularly to an apparatus adapted for checking the camber, caster, king pin inclination, toe-in and toe-out of each of such a dirigible pair of wheels.

Apparatus in common use for this general purpose is shown in U. S. Letters Patent to J. W. Morse et al., 2,061,326 and 2,108,383, and Herbert G. Holmes, 2,160,145.

There are certain time consuming steps involved in operating each apparatus of the prior art above mentioned which it is an object of the present invention to eliminate. For instance, each of the prior art devices aforesaid includes a base which is slidable towards and away from a wheel to measure each of the alignment characteristics mentioned.

It is an object of the present invention to decrease the number of times the base of the device has to be moved towards and away from the wheel to effect the measurement of an alignment characteristic as aforesaid.

A specific instance of difficulty met with in the prior art practice is in the measurement of caster which involves the reading of angles at which a wheel being tested is disposed in both vertical and horizontal planes.

It is a further object of the present invention to provide an apparatus which will accomplish this dual measurement with a greater degree of accuracy and with less manipulation and checking than are required with devices of the prior art.

When installing wheel aligning apparatus it is difficult to get the base exactly level. Also the foundation provided occasionally settles after installation. These conditions throw the apparatus out of plumb and introduce inaccuracies into the wheel aligning tests.

It is another object of the invention to provide such an apparatus which has within itself means for compensating for the supporting base not being level.

A further object of the invention is to provide such an apparatus by which camber can be quickly measured either from the tire or from the rim with a relatively small amount of adjustment of the apparatus.

The manner of accomplishing the foregoing objects as well as other objects and advantages will be made manifest in the following description taken in connection with the drawings in which Fig. 1 is a perspective view of a preferred embodiment of the invention as when applied to a wheel in the measuring of camber.

Fig. 6 is an enlarged detail sectional view taken on line 6—6 of Fig. 2 and illustrating the double camber scale plate.

Fig. 7 is a fragmentary vertical sectional view illustrating a modified form of the invention.

Before describing the illustrated embodiment of the invention in detail it is desired to define each of the alignment characteristics above referred to.

Camber is the angle that a front wheel is tilted outwardly at the top from vertical.

Caster is the angle which a king pin is tilted backward at the top from vertical.

King pin inclination is the angle which a king pin is tilted inwardly at the top from vertical.

Toe-in is the angle which a horizontal diameter of a wheel is inclined forwardly towards the longitudinal axis of the vehicle.

Toe-out, or steering geometry, relates to the mechanics of keeping the front wheels aligned with their respective directions of movement as the vehicle turns to the right or left.

For an explanation of the practical significance of the characteristics above defined, reference is had to the patents of the prior art.

The apparatus 10 of my present invention is adapted for measuring each of the aforesaid alignment characteristics, the mode by which this is accomplished being made clear hereinafter.

Figure 2:
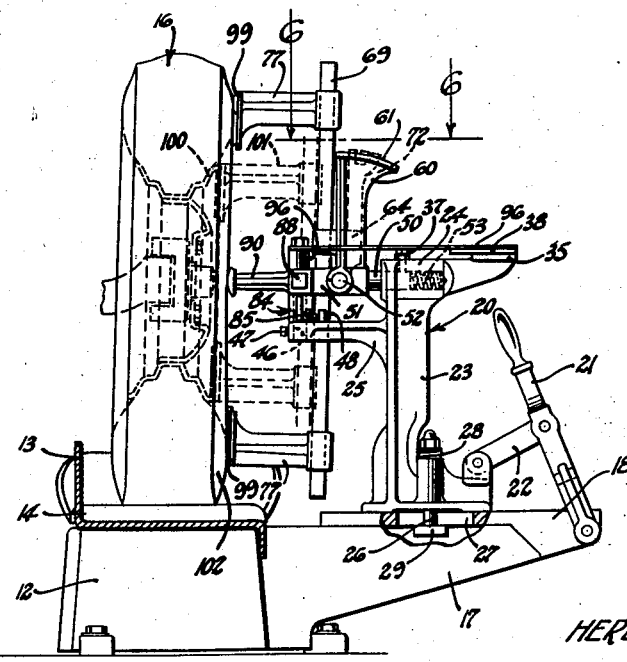
Fig. 2 is a cross section showing the device in side elevation and taken on the line 2—2 of Fig. 1.

The apparatus 10 is provided in duplicate units 11, each of which is adapted to support the front and rear wheels on one side of the vehicle being measured. Each of these units includes a base 12, providing a runway 13, onto which said two wheels of said vehicle are run, and a turntable 14, provided on said base on which the front wheel 16 of said pair is brought to rest as shown in Figs. 1 and 2.

Opposite the turntable 14, the base 12 has a lateral extension 17 providing a slideway 18 disposed on its upper surface at right angles to the runway 13. Slidably mounted on the slideway 18 is a gauge body 20, movement of which along the slideway is controlled by a lever 21 pivoted on the slideway 18 and connected to the gauge body 20 by a link 22. Gauge body 20 includes a standard 23 having a head 24 at its upper end and a bracket 25 extending inwardly therefrom. The body 20 has a bolt 26 extending downwardly through a slot 27 in the slideway 18 and having a spring 28 on said bolt which holds the head 29 thereof upwardly against the slideway on opposite sides of said slide. This retains the gauge body 20 on the slideway 18 while allowing this body to be slid along said slideway by manipulation of the lever 21.

Figure 4:
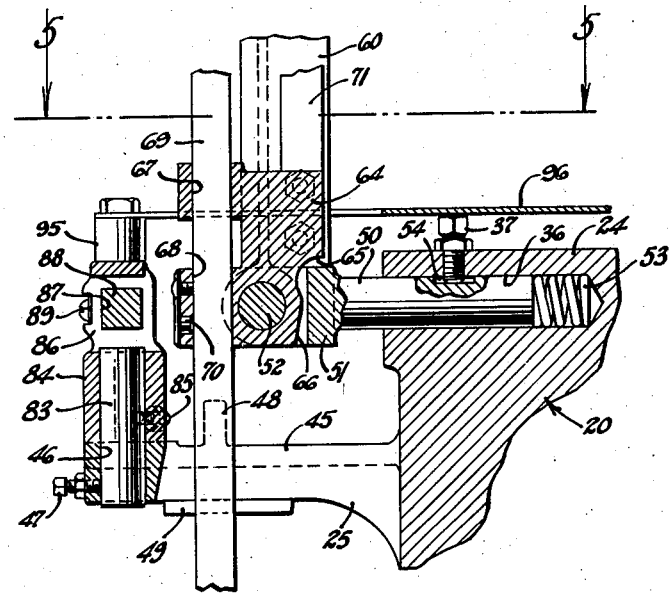
Fig. 4 is an enlarged fragmentary vertical view taken on the line 4—4 of Fig. 3 with the parts positioned as shown in Fig. 2.
Figure 5:
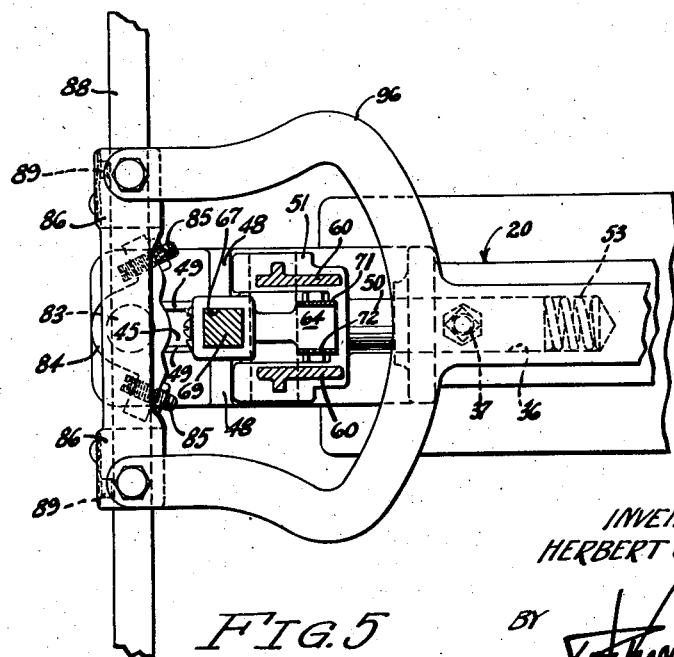
Fig. 5 is an enlarged fragmentary horizontal view taken on the line 5—5 of Fig. 4.

The head 24 has a scale mounting bracket 35 and is provided with a horizontal bore 36 and a stop limit screw 37 adapted to extend a limited distance into the bore 36 as shown in Fig. 4. Mounted on the bracket 35 is a scale plate 38 having arcuate scales 39 and 40 fixed thereon, the graduations on each of which will be described hereinafter.

The bracket 25 has a vertical opening 45, a vertical bore 46 and a set screw 47 penetrating to said bore. This bracket also has stop lugs 48 extending upwardly from the bracket on opposite sides of the opening 45.

Extending inwardly from the opening 45 are guide ledges 49 which are machined to provide parallel guide surfaces, the purpose of which will be made clear hereinafter.

Extending into the bore 36 of the head 24 is a cylindrical shank 50 of a bifurcated pivot bracket 51 carrying a pivot pin 52. The shank 50 traps a coiled expansion spring 53 between it and the blind end of the bore 36 and is held against rotation in said bore, with a limited degree of lengthwise movement therein, by the stop screw 37 extending downwardly into a groove 54 provided longitudinally in the upper surface of the shank 50. Extending upwardly from opposite forks of the pivot head 51 are plates 60 having arcuate upper edges concentric with the pin 52 and on which is fixed a scale plate 61, this plate having caster scale 62 and camber scale 63 mounted thereon. The precise nature of the indicia on these scales will be indicated hereinafter. The caster scale 62 is slidably adjustable on the plate 61.

Lying between the forks of the bifurcated bracket 51 and supported on the pin 52 is a contact bar slide head 64 having stop shoulders 65 and 66 which engage the bracket 51 to limit the rocking of the head 64 about the pin 52. This head also has contact bar slide openings 67 and 68 through which a contact bar 69 slides, this being yieldably retained thereon by a spring detent 70 which continuously presses inwardly against the bar 69. The bar 69 is preferably square and is dimensioned to neatly slide between the parallel guides 49 of the bracket 25. Secured to and extending upwardly from the pivot head 64 are indicator arms 71 and 72. Arm 71 has finger 74 overlying the caster scale 62. Arm 72 has fingers 75 and 76 overlying the camber scale 63 as shown in Figs. 1, 2, 3 and 6.

Slidably provided on the upper and lower ends of the bar 69 are wheel contact arms 77.

Fastened in the bore 46 of the bracket 25 by application of the set screw 47 thereto is a vertical pivot pin 83, on which a contact bar slide head 84 is pivotally mounted. This head has adjustable stops 85 which limit the swinging of the head 84 about the pin 83 by contact with the respective stop lugs 48. The head 84 is provided above the upper end of the pin 83 with a pair of guide sleeves 86 having square holes 87 in which a horizontal contact bar 88 is slidably mounted. Each of the sleeves 86 is provided with a detent spring 89 which bears against the bar 88 and thereby retains this bar in any given position in which it is placed in the sleeves 86. Slidably mounted on the opposite ends of the bar 88 are wheel contacting arms 90.

Extending upwardly from each of the sleeves 86 is a boss 95, an indicator hand 96 being mounted on these bosses the extremity of which sweeps over the scales 39 and 40.

The scale plate 63 has two scales, 97 and 98. The first of these is for measuring camber when end notches 99 of the arms 77 are engaging rim 100 of the wheel 16, as shown in dotted lines 101, in Fig. 2. Scale 98 is for use in measuring camber when the arms 77 engage the tire 102 of the wheel 16, as shown in full lines in Fig. 2 and in Fig. 1.

The fingers 75 and 76 on the arm 72 are for use respectively with the scales 97 and 98 as shown in Fig. 6. It will be noted that these scales are alike, but for any angle indicated by the finger 75 on the scale 97 the finger 76 indicates an angle on the scale 98 just three-eighths of a degree less. The necessity for this difference in angles indicated by the two scales 97 and 98 is because when measuring camber with the arms 77 engaging the rim 100, as shown in dotted lines 101 in Fig. 2, the bar 69 of the device is parallel with the rim 100, and thus with the whole rigid structure of the wheel itself including the bearings on which it is mounted. When measuring camber with the arm 77 in contact with the tire 102, as shown in full lines in Fig. 2, the bar 69 is deflected approximately three-eighths of a degree out of parallelism with the rim 100 by the bulge at the bottom of the tire 102.

Fig. 7 illustrates a modification 110 of the apparatus of my invention which is substantially like the apparatus 10 excepting for the manner in which a bracket 125, (which takes the place of bracket 25), is mounted on a standard 123, (which takes the place of the standard 23). Bracket 125 is separate from the standard 123 and includes a vertical plate 126, the lower end of which has a bolt 127 fixed therein which extends through a relatively large hole 128 in the standard 123, so as to permit a limited degree of adjustment of the lower end of the plate 126 relative to the standard 123.

The upper end of the plate 126 has a stub shaft 130 which extends through and is rotatable in a bore 131 provided in the standard 123. The plate 126 has a bore 132 which is concentric with and extends into the shaft 130, this bore receiving a shank 150 of a pivot bracket 151 (which take the place of the corresponding parts 50 and 51 of the apparatus 10). The shank 150 is trapped in the bore 132 so as to confine a spring 153 therein by a set screw 154, the latter extending into a notch 155 (which corresponds in function to the notch 54 in shank 50). The extending end of the stub shaft 130 has fixed thereon a fitting 160, on which is provided a scale plate 161 (which corresponds to the scale plate 38 in the apparatus 10).

The principal advantage of the apparatus 110 over the apparatus 10 results from the fact that in installing this apparatus the foundations therefor are sometimes not level, so that an error is thus introduced into the readings accomplished by the device. One of these errors results from the plane which includes both the axis of the bar 69 and the axis of the shank 50 not being vertical in taking caster readings. In the apparatus 110 this plane can be checked with a level and proper adjustment made by loosening up the bolt 127 and shifting the lower end of the plate 126 to swing the bracket 125 about the axis of the stub shaft 130. When the proper adjustment has been made the bolt 127 is then tightened up to bind the lower end of the plate 126 rigidly to the standard 123.

Operation

As already indicated, camber may be determined by the apparatus 10 in either of two ways. One of these is shown in dotted lines 101 in Fig. 2 and the other is shown in full lines in Figs. 1 and 2. The method in most common use is that shown in full lines and in which the arms 77 are positioned on the bar 69 to lie opposite the upper and lower portions of the tire 102 of the wheel 16 and the handle 21 then manipulated to shift the unit 11 disposed adjacent this wheel inwardly to bring the arms 90 and 77 into contact with the tire of the wheel. Before this is done the wheel of course is positioned, as nearly as possible by the eye, with its horizontal diameter parallel with the fore and aft axis of the vehicle. When this parallelism has been attained, this is indicated by the pointer 96 pointing to zero on the angle scale 39.

Simultaneous contact of the arms 77 and 90 with the tire of the wheel is made possible by the provision of the spring 53, which yields as indicated in Fig. 4, to permit the continued inward movement of the body 20 of the device, to bring the arms 90 into contact with the tire after the arms 77 have already engaged the tire. It is thus seen that all four arms may be brought into contact with the tire with a single easy movement of the unit body 20, merely by manipulation of the lever 21. The reason the arms 77 contact the tire 102 first is because of the bulge in the lower portion of this tire produced by a portion of the weight of the car being supported by the tire.

When the wheel 16 has been adjusted with its horizontal diameter parallel with the fore and aft axis of the vehicle, as aforesaid, by bringing the arms 77 and 90 all into contact with the tire and adjusting the wheel until the pointer 96 reads at zero on the scale 39, the camber of this wheel may be read in degrees on the scale 98. If the finger 76 were disposed at this time as shown in Fig. 6, a camber of one-half a degree would be indicated.

The other way of checking camber with the apparatus 10 is to go through exactly the same steps of bringing the wheel 16 into parallelism with the car, with the arms 77 in dotted line positions 101, and then reading the camber from the scale 97. If the finger 75 were disposed as shown in Fig. 6, a camber of one-eighth of a degree would be indicated.

Figure 3:
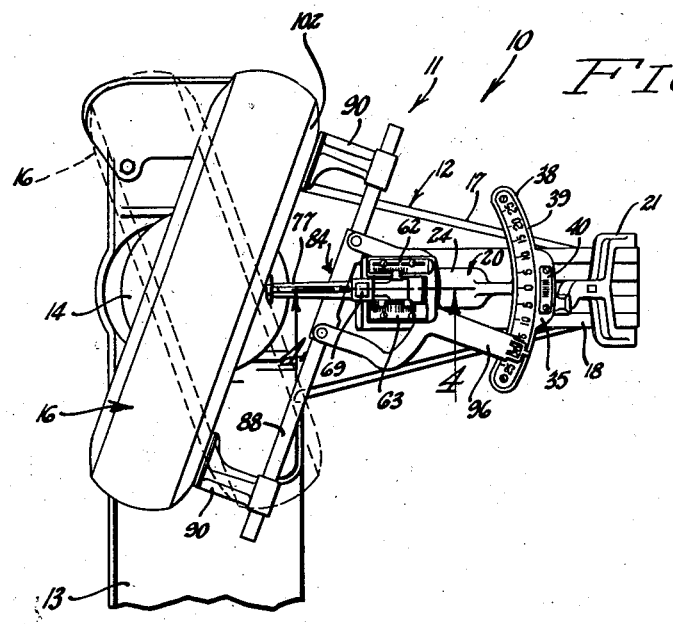
Fig. 3 is a plan view of the device as when applied to a wheel in the measuring of caster.

To ascertain the caster, or rearward inclination from vertical, of the king pin of the wheel 16 (see Fig. 3) the unit 11 is operated as follows: The carriage 20 and associated parts are retracted from engagement with the tire of the wheel 16 by pulling on the lever 21 and the wheel 16 is then turned outward by the steering gear to an angle approximately twenty degrees relative to the fore and aft axis of the vehicle, as shown in full lines in Fig. 2. Then the carriage 20 is shifted inwardly and the bar 88 slid forwardly in the sleeves 86 and all four arms 77 and 90 are brought into engagement with the tire of the wheel 16 as shown in Fig. 3. If the wheel was not swung to an angle of exactly twenty degrees with the longitudinal axis of the vehicle, the lever 21 is retracted to move the contact arms 90 and 77 away from the wheel, the angle of the latter adjusted and the arms 90 and 77 again brought into contact with the tire of the wheel until the hand 96 is brought to a point on the gauge body 20 on the scale 39 as shown in Fig. 2, indicating that the wheel 16 has been swung inwardly so that the diameter of this wheel engaged by the arms 90 is disposed at an angle of twenty degrees relative to the longitudinal axis of the vehicle.

When this angle has been reached with the wheel 16 turned outwardly as shown in full lines in Fig. 3, all four of the contact arms 77 and 90 are in engagement with the tire of the wheel 16. The caster scale plate 62 is now slid on the plate 61 until "0" thereon is opposite the pointer 74.

The arms 77 and 90 are now pulled away from contact with the wheel 16 and (as shown in dotted lines in Fig. 3) this wheel is turned inward twenty degrees from parallelism with the axis of the vehicle being tested and the unit 11 again moved so as to bring all four arms 77 and 90 into contact with the tire of the wheel 16. The scale plate 62 is so calibrated that when this has been done, the pointer 74 will indicate on the scale plate 62 the number of degrees of the caster of the wheel 16.

The mathematics by which caster is thus indicated is well known in the art and is so thoroughly explained in the prior art patents on method and apparatus for determination of caster that no detailed explanation of it is necessary here.

From an examination of my prior U. S. Patent No. 2,160,145, it will be seen that I can readily utilize one of the units 11 to check the king pin inclination of the wheel adjacent thereto. To do this, the arms 77 should be removed from the vertical bar 69. The upright scale plate 68 of the patent is then attached to the axle of said wheel and the contacting and positioning device 91 of the patent placed on the bar 88 of my present invention. The manipulation of the apparatus thus assembled to check king pin inclination is illustrated and described in my prior patent aforesaid.

Toe-in of a pair of front wheels 16 of a vehicle may be measured by the apparatus 10 of my invention by moving both units 11 inwardly into contact with the respective front wheels of the vehicle, adjusting these wheels with the steering mechanism until the hand 96 on one of the units 11 points to zero on the toe-in scale plate 40 thereof, and then observing the value on the scale plate 40 of the other unit 11 to which the hand 96 thereof points. These scale plates 40 are so calibrated that the value thus pointed to will represent the angle of toe-in of the wheels 16 thus tested.

Toe-out is tested by the apparatus 10 of my invention by applying both units 11 to the respective front wheels 16 while one of these wheels is turned to a predetermined angle, measured on the scale plate 39 of the unit engaging this wheel, and then checking the angle indicated by the hand 96 on the scale 39 of the other of said units. As well known in the art these two angles for a car of a given wheel base must have a certain relation according to a schedule furnished by the manufacturer of the vehicle in order for both wheels to be in alignment with the path they are travelling along when the vehicle is turned. These angles must be such, of course, that the axes of all the wheels of the vehicle intersect at a given point, this being the center about which the vehicle is turning.

What I claim is:

1. An apparatus for determining alignment characteristics of a front wheel of an automobile, said apparatus comprising a base; a carriage shiftable on said base toward and away from said wheel; means mounted on a vertical pivot on said carriage and adapted when said carriage is moved toward said wheel to engage opposite points on said wheel substantially in a horizontal plane and measure the angle between said wheel in said horizontal plane and the fore and aft axis of said automobile; and a separate means pivotally mounted on said carriage on a horizontal axis and adapted to engage said wheel in a vertical plane, when said carriage is shifted toward said wheel, to measure the angle that said wheel is inclined from vertical in a plane normal to said axis.

2. An apparatus for determining alignment characteristics of a front wheel of an automobile, said apparatus comprising a base; a carriage shiftable on said base toward and away from said wheel; means mounted on a vertical pivot on said carriage and adapted when said carriage is moved toward said wheel to engage opposite points on said wheel substantially in a horizontal plane and measure the horizontal angle between said wheel and a line normal to the direction in which said carriage is shiftable on said base; a separate means pivotally mounted on said carriage on a horizontal axis and adapted to engage said wheel in a vertical plane when said carriage is moved toward said wheel to measure the angle that said wheel is inclined from vertical in a plane parallel with said direction; and means on said carriage adapting one of the aforesaid pivotally mounted means to yield with respect to said carriage when said carriage is moved towards said wheel.

3. An apparatus for determining alignment characteristics of a front wheel of an automobile, said apparatus comprising a base; a carriage shiftable on said base toward and away from said wheel; means mounted on a vertical pivot on said carriage and adapted when said carriage is moved toward said wheel to engage opposite points on said wheel substantially in a horizontal plane and measure the angle between said wheel in a horizontal plane and a line normal to the direction in which said carriage is shiftable on said base; a separate means pivotally mounted on said carriage on a horizontal axis and adapted to engage said wheel in a vertical plane when said carriage is shifted toward said wheel to measure the angle that said wheel is inclined from vertical in a plane parallel with said direction; and means on said carriage adapting the second recited of the aforesaid pivotally mounted means to yield with respect to said carriage and parallel with the aforesaid direction when said carriage is moved towards said wheels.

4. An apparatus for determining alignment characteristics of a front wheel of an automobile, said apparatus comprising a base; a carriage shiftable on said base toward and away from said wheel; a horizontal wheel contacting bar; means for pivotally mounting said horizontal bar on said carriage on a vertical axis; a vertical wheel contacting bar; means for pivotally mounting said vertical bar on said carriage on a horizontal axis so that said vertical bar is in crossed relation with said horizontal bar and disposed to the rear thereof; and means on said bars for contacting said wheel.

5. An apparatus for determining alignment characteristics of a front wheel of an automobile, said apparatus comprising a base; a carriage shiftable on said base toward and away from said wheel; a vertical measuring bar; a horizontal measuring bar; means for separately mounting said bars pivotally on said carriage on axes disposed at right angles respectively with said bars; and means on said bars for contacting said wheel.

6. An apparatus for determining alignment characteristics of a front wheel of an automobile, said apparatus comprising a base; a carriage shiftable on said base toward and away from said wheel; separate vertical and horizontal measuring bars; pivot heads in which said bars are respectively slidable; means for separately pivoting said pivot heads on said carriage on axes disposed at right angles respectively to said bars; and means on said bars for contacting said wheel.

7. A combination as in claim 6 in which means is provided on said carriage for adapting one of said pivot heads to yield relative to the other pivot head when said carriage is moved toward said wheel to accomplish an adjustment of said bars to said wheel.

8. An apparatus for determining alignment characteristics of a front wheel of an automobile, said apparatus comprising: means optionally shiftable in a vertical plane into parallelism with the tire of said wheel or with the rim of said wheel; means for shifting the aforesaid means into either of said positions; and unitary angle indicating means responsive to the first aforesaid means to indicate in degrees the camber of said wheel whenever said shiftable means is placed in either of the aforementioned positions, said angle indicating means comprising duplicate scales and pointer means cooperating therewith, said pointer means indicating on one of said scales the camber when said shiftable means is in parallelism with said tire, said pointer means indicating on the other of said scales the camber when said shiftable means is in parallelism with said rim.

HERBERT G. HOLMES.